United States Patent
Teratani et al.

(10) Patent No.: US 10,053,003 B2
(45) Date of Patent: *Aug. 21, 2018

(54) DISPLAY CONTROL DEVICE FOR METER

(71) Applicant: TOYOTA JIDOSHA KABUSHIKI KAISHA, Toyota-shi, Aichi-ken (JP)

(72) Inventors: Yoshiyuki Teratani, Nagoya (JP); Osamu Kanai, Nagoya (JP); Yuki Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,969

(22) Filed: May 26, 2017

(65) Prior Publication Data
US 2017/0341570 A1 Nov. 30, 2017

(30) Foreign Application Priority Data
May 26, 2016 (JP) .................. 2016-105676

(51) Int. Cl.
*B60Q 1/00* (2006.01)
*B60W 10/04* (2006.01)
(Continued)

(52) U.S. Cl.
CPC .............. *B60Q 1/447* (2013.01); *B60K 37/02* (2013.01); *B60K 41/065* (2013.01); *B60Q 1/54* (2013.01);
(Continued)

(58) Field of Classification Search
CPC .......... B60Q 1/447; B60Q 1/54; B60Q 1/445; B60Q 1/20; B60K 37/02; B60K 41/065;
(Continued)

(56) References Cited

U.S. PATENT DOCUMENTS 6,014,604 A * 1/2000 Kuroiwa ............... B60W 10/06
477/115
6,149,546 A * 11/2000 Tabata .................... F16H 61/16
477/125
(Continued)

FOREIGN PATENT DOCUMENTS

JP 2009-029401 A 2/2009
JP 2009-220678 A 10/2009
JP 2016-060462 A 4/2016

OTHER PUBLICATIONS

Dec. 15, 2016 Office Action issued in U.S. Appl. No. 14/855,013.
Apr. 12, 2017 Notice of Allowance issued in U.S. Appl. No. 14/855,113.

*Primary Examiner* — Jack K Wang
(74) *Attorney, Agent, or Firm* — Oliff PLC

(57) ABSTRACT

When an automatic transmission shift start condition is satisfied, an electronic control unit calculates a meter target rotational speed of an engine by adding a correction amount corresponding to the state of a torque converter to a turbine rotational speed corresponding to a post-shift gear stage, and makes a meter display rotational speed follow after the meter target rotational speed, fixes the correction amount to a value obtained at the time of shift start determination, when immobilization conditions including that the shift start condition for a downshift is satisfied and that the engine is driven are satisfied. When actual rotational speed display conditions are satisfied, it can be predicted that differences between an engine rotational speed and a turbine rotational speed before and after shifting are large, and so the electronic control unit sets a current engine rotational speed as the meter target rotational speed or ends the control.

14 Claims, 12 Drawing Sheets

(51) Int. Cl.
*B60Q 1/44* (2006.01)
*B60Q 1/54* (2006.01)
*B60K 37/02* (2006.01)
*G01P 3/08* (2006.01)
*G01P 3/10* (2006.01)
*F16H 61/16* (2006.01)
*F16H 31/00* (2006.01)
*B60Q 1/50* (2006.01)
*G01P 3/02* (2006.01)

(52) U.S. Cl.
CPC ............... *G01P 3/08* (2013.01); *G01P 3/10* (2013.01); *B60K 41/062* (2013.01); *B60K 41/067* (2013.01); *B60Q 1/445* (2013.01); *B60Q 1/50* (2013.01); *G01P 3/02* (2013.01)

(58) Field of Classification Search
CPC ....... B60K 41/062; B60K 41/067; G01P 3/08; G01P 3/10; G01P 3/02
USPC .................. 340/441; 477/125, 115; 475/120
See application file for complete search history.

(56) References Cited

U.S. PATENT DOCUMENTS

| | | | | |
|---|---|---|---|---|
| 6,540,635 | B1* | 4/2003 | Sano | F16H 61/0206 475/120 |
| 7,024,298 | B2* | 4/2006 | Oohori | B60W 10/06 180/197 |
| 7,571,712 | B2* | 8/2009 | Kuroda | F02P 5/103 123/339.12 |
| 8,672,807 | B2* | 3/2014 | Atsumi | B25F 5/001 477/115 |
| 9,696,333 | B2* | 7/2017 | Teratani | G01P 1/07 |
| 2005/0229894 | A1* | 10/2005 | Okano | F02B 61/02 123/197.1 |
| 2008/0015768 | A1* | 1/2008 | Masuda | B60W 30/182 701/99 |
| 2013/0079986 | A1* | 3/2013 | Ozawa | B60K 37/02 701/36 |
| 2016/0084874 | A1 | 3/2016 | Teratani et al. | |
| 2017/0341600 | A1* | 11/2017 | Kannzaki | B29C 33/424 |

* cited by examiner

< RELATED ART >

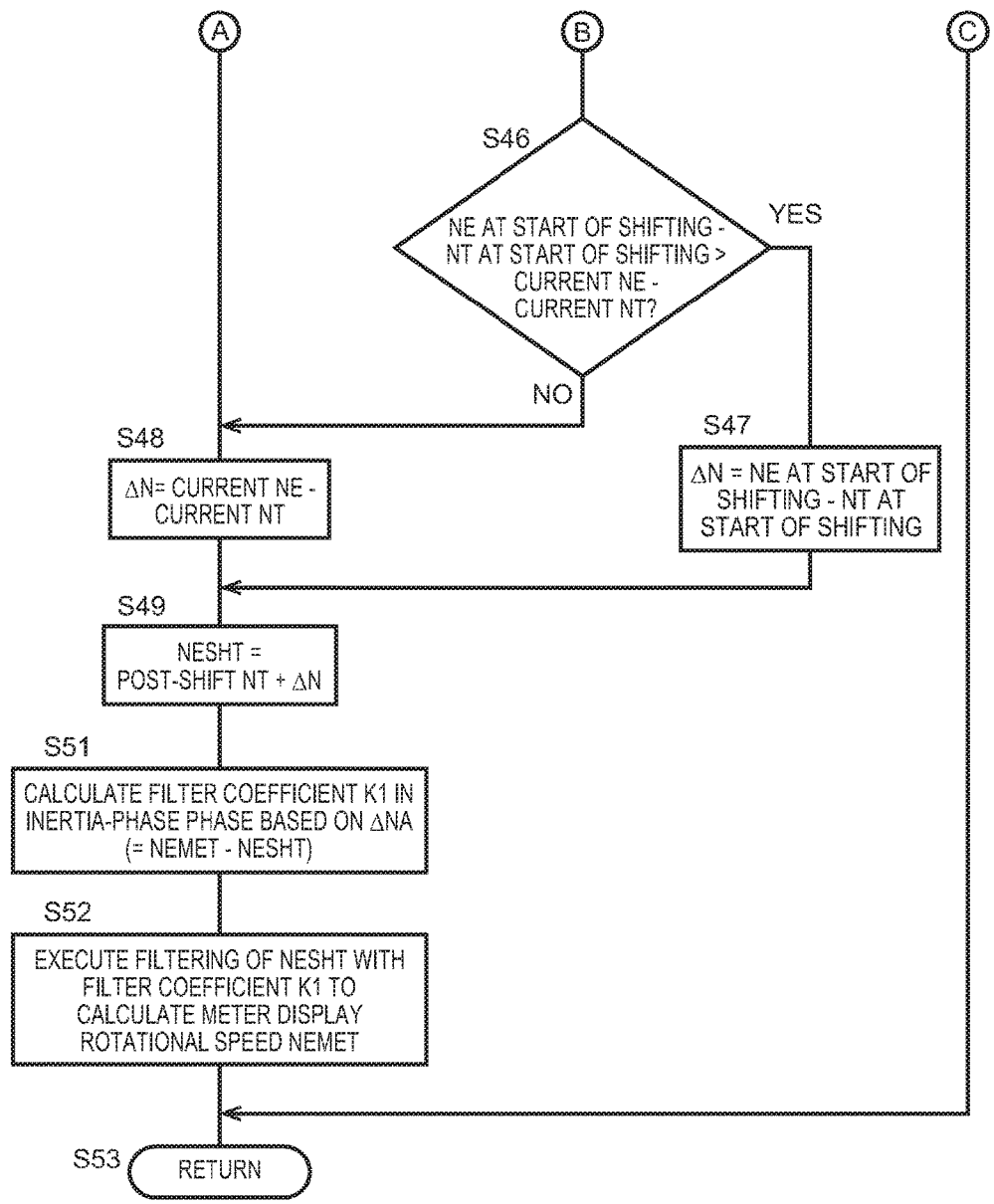

DISPLAY CONTROL DEVICE FOR METER

CROSS-REFERENCE TO RELATED APPLICATIONS

This application claims priority to Japanese Patent Application No. 2016-105676 filed on May 26, 2016, which incorporated herein by reference in its entirety.

BACKGROUND

1. Technical Field

The present disclosure relates to display control devices for a meter, and more particularly relates to a display control device for a meter that displays engine rotational speed in a vehicle including a torque converter and an automatic transmission.

2. Description of Related Art

Vehicles such as automobiles are conventionally equipped with a meter (so-called a tachometer) that displays engine rotational speed. In such a tachometer, the engine rotational speed is estimated and displayed on the tachometer for the purpose of enhancing responsiveness during shifting (see Japanese Patent Application Publication No. 2009-220678, for example).

SUMMARY

In the technique disclosed in Japanese Patent Application Publication No. 2009-220678, a meter rotational speed (i.e., a meter target rotational speed) is calculated using one of an actual engine rotational speed and an estimated engine rotational speed calculated from a turbine rotational speed in accordance with the state of an automatic transmission, for example. The method for calculating the meter target rotational speed is changed in accordance with phases during shifting. For example, in an inertia phase during shifting, the meter target rotational speed is calculated by adding a difference between an actual engine rotational speed and an actual turbine rotational speed at the start of the inertia phase to the turbine rotational speed obtained from a post-shift gear stage. In other phases during shifting or when the gear is not shifted, one of an actual engine rotational speed and an estimated rotational speed, which is calculated from a parameter such as an engine torque and a torque ratio, is used as the meter target rotational speed in the state where a lock-up clutch is disengaged, whereas one of the actual engine rotational speed and the estimated rotational speed, which is calculated from the actual engine rotational speed, a turbine rotational speed and a vehicle rotational speed, is used as the meter target rotational speed in the state where the lock-up clutch is engaged (or slip-engaged).

The aforementioned meter display control is configured in consideration of a rotational speed difference between the engine rotational speed and the turbine rotational speed, the difference being generated due to slipping of a torque converter when the clutch is not in a locked-up state. However, applying such estimation processing increases deviation between the actual engine rotational speed and the meter target rotational speed if a downshift is performed with a large engine torque. As a result, the meter target rotational speed rapidly changes toward the actual engine rotational speed at the end of the control, which results in a problem of unexpected decrease in the meter display rotational speed.

For example, in the case such as immediately after release of an accelerator from a high depression state of the accelerator, smoothing is applied for a certain period of time to gradually set the engine torque to zero even with the accelerator being turned off, the smoothing being performed in order to prevent behavior disturbance of the vehicle caused by rapid torque change. For a predetermined period after the accelerator is turned off, the engine torque continues to be at a high level. When manual shifting operation is performed to instruct downshifting in this state, the meter target rotational speed in the inertia phase is calculated as described before. However, since the engine torque is still at a high level, there is a difference between the engine rotational speed and the turbine rotational speed, so that a large value is set as the meter target rotational speed. Once the engine torque decreases and then the actual engine rotational speed decreases after completion of shifting, the deviation between the actual engine rotational speed and the meter target rotational speed increases. Consequently, a normal control termination routine fails to terminate the control, which leads to forced termination of the control with use of a timer and the like. As a result, the meter target rotational speed rapidly changes toward the actual engine rotational speed after the lapse of a certain period of time, and therefore the meter display rotational speed decreases at unexpected timing. This causes a problem of incongruity with a vehicle behavior.

The control disclosed in Japanese Patent Application Publication No. 2009-220678 may be replaced with another control, in which the meter display rotational speed is obtained by adding a sequentially calculated difference between the actual engine rotational speed and the actual turbine rotational speed to the turbine rotational speed corresponding to the post-shift gear stage in the inertia phase, for example. However, in such control, a phenomenon may occur in which the engine rotational speed to be displayed temporarily decreases although the actual engine rotational speed increases.

For example, in the case where the gear is downshifted when the accelerator is turned off, the engine rotational speed is higher than the turbine rotational speed at the beginning of the shifting. However, once the shifting progresses, an automatic transmission side increases the turbine rotational speed, so that the engine is put in a driven state, and the turbine rotational speed becomes higher than the engine rotational speed. Accordingly, the correction amount, which is positive at the beginning of the shifting, becomes negative as the shifting progresses. As a result, the display engine rotational speed temporarily demonstrates a considerable decrease, and behaves in an opposite manner from the increasing engine rotational speed, which leads to a problem of giving a sense of incongruity to a driver.

The present disclosure has been made in view of the above-stated circumstances, and it is an object of the present disclosure to provide a display control device for a meter capable of reducing unnatural display while maintaining the responsiveness of engine rotational speed displayed on a meter.

Accordingly, one aspect of the present disclosure provides a display control device for a meter provided in a vehicle including a torque converter and an automatic transmission, the meter being configured to display engine rotational speed. The display control device includes an electronic control unit. The electronic control unit is configured to: (i)

when a shift start condition of the automatic transmission is satisfied, add a correction amount corresponding to a state of the torque converter to a turbine rotational speed of the torque converter corresponding to a post-shift gear stage so as to (a) calculate an estimated rotational speed of the engine, (b) set the estimated rotational speed as a meter target rotational speed, and (c) approximate a display rotational speed displayed on the meter to the meter target rotational speed; (ii) fix the correction amount to a value obtained at the time of shift start determination, when immobilization conditions are satisfied, the immobilization conditions including that the shift start condition for the automatic transmission to perform a downshift is satisfied and that the engine is driven from a side of the torque converter; and (iii) set as the meter target rotational speed a current engine rotational speed in place of the estimated rotational speed, or end a series of control including calculation of the estimated rotational speed, when actual rotational speed display conditions are satisfied, the actual rotational speed display conditions including (a) that the shift start condition for the automatic transmission to perform the downshift is satisfied, (b) that the engine is driven from the side of the torque converter, and (c) that change in a difference between an engine rotational speed and the turbine rotational speed of the torque converter before and after shifting is determined to be large.

According to the display control device for a meter as described in the forgoing, changes such as reversal of the signs of the correction amount do not occur in a driven state where the engine is driven from the torque converter side. Furthermore, in the case, such as where a downshift is performed with a large engine torque, deviation between the actual engine rotational speed and the meter target rotational speed does not increase either. As a result, it becomes possible to reduce unnatural change in the display rotational speed of the meter while maintaining the responsiveness of the engine rotational speed displayed on the meter.

According to the display control device for a meter of the present disclosure, when the shift start condition is satisfied, the electronic control unit calculates an estimated engine rotational speed by adding the correction amount corresponding to the state of the torque converter to the turbine rotational speed. The electronic control unit uses the estimated rotational speed as a meter target rotational speed unless the actual rotational speed display conditions are satisfied. This makes it possible to obtain high responsiveness of the engine rotational speed displayed on the meter. When the engine is in the driven state during downshifting, the immobilization conditions are satisfied, and so the correction amount is fixed to a value obtained at the time of shift start determination. As a result, the correction amount is maintained positive. In short, reversal of the signs of the correction amount caused by the turbine rotational speed becoming higher than the engine rotational speed is avoided. When change in difference between the engine rotational speed and the turbine rotational speed before and after shifting becomes large, as in the case where downshifting is performed immediately after accelerator operation so that the engine is in the driven state, the actual rotational speed display conditions are satisfied. Accordingly, the actual engine rotational speed is set as the meter target rotational speed, or a series of control including calculation of the estimated rotational speed is ended and the actual engine rotational speed is set as the meter display rotational speed. As a result, increase in deviation between the actual engine rotational speed and the meter display rotational speed is suppressed. That is, since excessive increase in meter target rotational speed due to increase in the correction amount is avoided, the display rotational speed displayed on the meter does not rapidly decrease toward the actual engine rotational speed at the end of the control.

Here, in the display control device, the electronic control unit may be configured to determine that the change in the difference between the engine rotational speed and the turbine rotational speed of the torque converter before and after shifting is large when any one of conditions are satisfied, the conditions including that (a) the difference between the engine rotational speed and the turbine rotational speed at the time when the shift start condition is satisfied is larger than a specified reference difference value, (b) engine torque is larger than a specified reference torque value, and (c) an actual engine rotational speed is larger than an estimated post-shift engine rotational speed. Whether or not the change in the difference between the engine rotational speed and the turbine rotational speed of the torque converter before and after shifting becomes large can be determined based on, for example, satisfaction of one of these conditions. The reference difference value and the reference torque value are constants for determining a remaining state of the engine torque. The values are set in accordance with the characteristics of the automatic transmission, the torque converter, and the like.

In the display control device, the correction amount may be the difference between the engine rotational speed and the turbine rotational speed. While the correction amount is calculable by various methods, such as a calculation method involving a torque capacity of a clutch, the correction amount can easily be obtained by the process described in the foregoing.

In the display control device, the electronic control unit may be configured to: when a difference between a current engine rotational speed and a current turbine rotational speed becomes larger than the fixed correction amount, (i) cancel a fixed correction amount, and (ii) use a difference between the current engine rotational speed and a current turbine rotational speed as the correction amount. According to the above-stated display control device, when the correction amount is set and fixed to the difference between the engine rotational speed and the turbine rotational speed, the fixed correction amount is canceled in synchronization with the return of the engine from the driven state to the driving state, so that the meter display rotational speed is returned to an original state. This makes it possible to recover the meter display that is free from delay in change of the meter display rotational speed, the delay being caused by detection delay of the engine rotational speed, and the like.

In the display control device, the actual rotational speed display conditions may further include that the phase during shifting of the automatic transmission is an inertia phase. In this configuration, in the torque phase where the engine side rotates the turbine of the automatic transmission, the responsiveness of the meter display rotational speed can be kept enhanced.

In the display control device, the actual rotational speed display conditions may further include that blipping control is not executed, the blipping control being control for increasing engine torque by increasing a throttle opening during shifting. In this configuration, during the blipping control in which increase in the engine rotational speed is expected, the responsiveness of the meter display rotational speed can be kept enhanced.

In the display control device, the electronic control unit may be configured to: (i) determine whether or not the shift start condition is satisfied based on an accelerator depression amount and a vehicle speed, and output the post-shift gear stage; (ii) calculate a post-shift turbine rotational speed based on the vehicle speed and the post-shift gear stage, and add the correction amount to the post-shift turbine rotational speed to calculate the estimated rotational speed; and (iii) switch the meter target rotational speed to one of the estimated rotational speed and a rotational speed of the engine detected with a rotation sensor based on a progress state of shifting, and output the display rotational speed such that the display rotational speed follows after the target value. The above-stated display control device can enhance the responsiveness of the meter display rotational speed, and implement a meter control unit configured to output the meter display rotational speed that changes naturally even during downshifting.

The electronic control unit may be configured to: change the rotational speed of approximating the display rotational speed to a target value based on the progress state of shifting. With this configuration, change in the meter display rotational speed can be smoothed with the degree corresponding to the phase representing the progress state of shifting.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 14B illustrates a flowchart of calculation processing P1' executed in the inertia-phase phase as a modified example of the display control of the embodiment.

DETAILED DESCRIPTION OF EMBODIMENTS

Hereinbelow, one embodiment of the present disclosure will be described in detail with reference to the accompanying drawings. In the following embodiment, the drawings are simplified or deformed as necessary, and therefore the details of each component, such as a proportion and a form, may be different from those of real components. Identical components are designated by identical reference signs, and their names and functions are also identical. Therefore, the detailed description of the identical components is not repeatedly provided.

Figure 1:
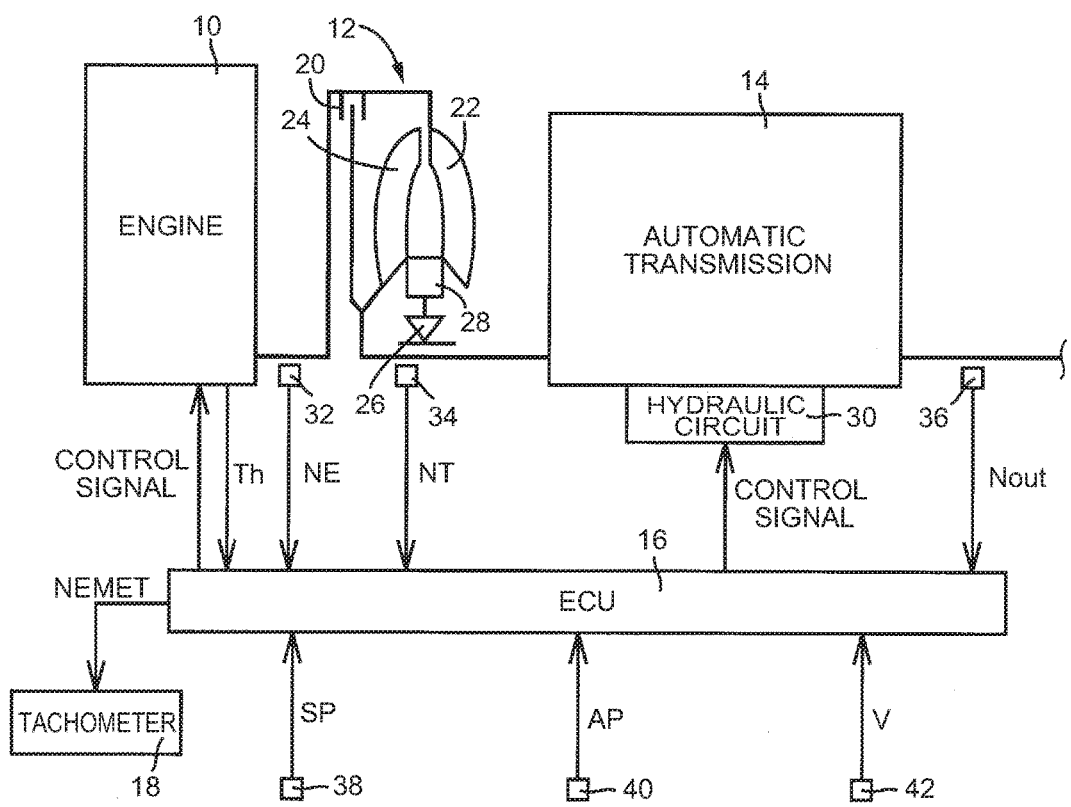
FIG. 1 is a conceptual view illustrating a powertrain of a vehicle to which the meter display control device of an embodiment as one example of the present disclosure is applied.

FIG. 1 illustrates the configuration of a powertrain of a vehicle incorporating the display control device for a meter according to the present embodiment. As illustrated in FIG. 1, the powertrain of the vehicle includes an engine 10 serving as a driving force source, a torque converter 12, a stepped automatic transmission 14, an electronic control unit (ECU) 16, and a tachometer 18.

An output shaft of the engine 10 is connected to an input shaft of the torque converter 12. The torque converter 12 includes a lock-up clutch 20 that directly couples an input shaft and an output shaft, a pump impeller 22 on an input-shaft side, a turbine impeller 24 on an output-shaft side, and a stator impeller 28 having a one-way clutch 26 to demonstrate a torque amplification function. The output shaft of the torque converter 12 is connected to an input shaft of the automatic transmission 14.

The torque converter 12 transmits from the engine 10 side to the automatic transmission 14 a torque with a magnitude corresponding to a slip amount that is a difference between a rotational speed of the pump impeller 22 on the input-shaft side (i.e., a rotational speed of the engine 10) and a rotational speed of the turbine impeller 24 on the output-shaft side (i.e., an input-shaft rotational speed of the automatic transmission 14).

The automatic transmission 14 includes a plurality of planetary gear units, a plurality of hydraulic friction engagement elements, and a hydraulic circuit 30 for regulating the hydraulic pressure supplied to the plurality of friction engagement elements. The hydraulic circuit 30 is constituted of an oil pump, various solenoids controlled based on control signals from the ECU 16, and an oilway (all of these members are not illustrated). By controlling the various solenoids of the hydraulic circuit 30, the ECU 16 controls engagement force of the plurality of friction engagement elements and thereby controls a transmission gear ratio of the automatic transmission 14.

The ECU 16 that controls the powertrain is connected to sensors, such as an engine rotational speed sensor 32, a turbine rotational speed sensor 34, an output-shaft rotational speed sensor 36, a position switch 38, an accelerator depression sensor 40, and a vehicle speed sensor 42, through a wire harness and the like.

The engine rotational speed sensor 32 detects a rotational speed (engine rotational speed) NE (rpm) of the engine 10. The turbine rotational speed sensor 34 detects a rotational speed (turbine rotational speed) NT (rpm) of the turbine impeller 24 of the torque converter 12. The output-shaft rotational speed sensor 36 detects a rotational speed of the output shaft (output shaft rotational speed) Nout (rpm) of the automatic transmission 14. The position switch 38 detects a position (shift position) SP of a shift lever operated by a driver. The accelerator depression sensor 40 detects an actual operation amount (actual accelerator depression amount) AP of the accelerator pedal by the driver. The vehicle speed sensor 42 detects the vehicle speed based on the rotational speed of wheels. Although not unillustrated, a throttle opening sensor provided in the engine 10 detects a throttle opening Th. These sensors each transmit a signal indicating a detection result to the ECU 16.

The ECU 16 calculates a meter display rotational speed NEMET based on the aforementioned signals of each sensor, and displays on the tachometer 18 the calculated meter display rotational speed NEMET.

Figure 2:
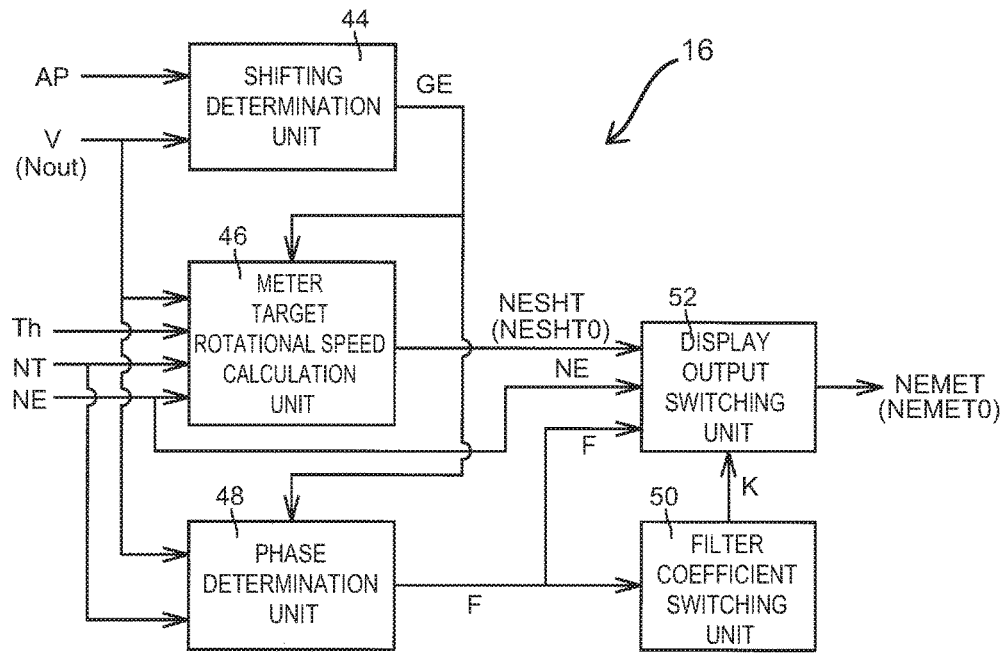
FIG. 2 is a functional block diagram illustrating a principal part of control functions included in an electronic control unit illustrated in FIG. 1.

FIG. 2 is a block diagram illustrating the configuration of the ECU 16 relating to the meter display. With reference to FIG. 2, the ECU 16 includes a shifting determination unit 44, a meter target rotational speed calculation unit 46, a phase determination unit 48, a filter coefficient switching unit 50, and a display output switching unit 52.

The shifting determination unit 44 performs shifting determination of the automatic transmission 14 with reference to a preset gear shift diagram of the automatic transmission 14 based on the accelerator depression amount AP and the vehicle speed V, and outputs a post-shift gear stage GE. When the vehicle is set to a manual shift mode, the shifting determination unit 44 outputs the post-shift gear stage GE based on the shift operation of the driver.

The meter target rotational speed calculation unit 46 calculates a meter target rotational speed NESHT based on the vehicle speed V, the throttle opening Th, a turbine rotational speed NT, an engine rotational speed NE, and the post-shift gear stage GE. Specifically, with a current gear stage being defined as G and a post-downshift gear stage being defined as G−1, the meter target rotational speed calculation unit 46 calculates a post-shift turbine rotational speed NT(G−1) based on the vehicle speed V and the post-shift gear stage GE (=G−1). The meter target rotational speed calculation unit 46 then adds a correction amount ΔN to the post-shift turbine rotational speed NT(G−1) to calculate an estimated rotational speed, and sets the calculated estimated rotational speed as the meter target rotational speed NESHT. Or when specified actual rotational speed display conditions are satisfied, the meter target rotational speed calculation unit 46 sets an actual engine rotational speed NE as the meter target rotational speed NESHT. The correction amount ΔN will be described later in FIGS. 3 and 4. The actual rotational speed display conditions will also be described later.

The phase determination unit 48 outputs a phase signal F indicative of the progress of shifting based on the vehicle speed V, the gear stage GE, and the turbine rotational speed NT. An initial stage from occurrence of shifting determination to the start of change in the turbine rotational speed NT is referred to as a preparation phase (F=0). A changing stage of the turbine rotational speed NT caused by shifting is referred to as an inertia-phase phase (F=1), and a stage from near completion of the change in the turbine rotational speed NT caused by shifting to completion of shifting is referred to as an end phase (F=2). The inertia-phase phase is also referred to as a change phase. The phase signal F indicates to which phase the shifting operation is currently progressing (described later in FIGS. 3 and 4).

The filter coefficient switching unit 50 determines a filter coefficient K based on the phase signal F. The filter coefficient K is used when the display output switching unit 52 performs filtering.

The display output switching unit 52 performs filtering so that the meter display rotational speed NEMET shows a gradual change even when the target value to be displayed shows a steep change. The display output switching unit 52 selects a target value of the meter display rotational speed NEMET from one of the engine rotational speed NE and the meter target rotational speed NESHT based on the progress state of shifting, i.e., the phase signal F. The display output switching unit 52 then outputs the meter display rotational speed NEMET so that the meter display rotational speed NEMET follows after the target value at the rotational speed corresponding to the filter coefficient K. Such processing is referred to as filtering, the filtering being also referred to as smoothing.

More specifically, the display output switching unit 52 determines a variation per processing cycle such that the current meter display rotational speed NEMET reaches the target value after the lapse of time corresponding to the filter coefficient K, and calculates the meter display rotational speed NEMET of a next cycle.

When the ECU 16 having such a configuration executes the estimation processing of the engine rotational speed constantly in a similar manner, a phenomenon occurs in which the engine rotational speed NEMET displayed on the meter (tachometer 18) temporarily decreases even though the actual engine rotational speed NE is increasing as described below in FIG. 3.

Figure 3:
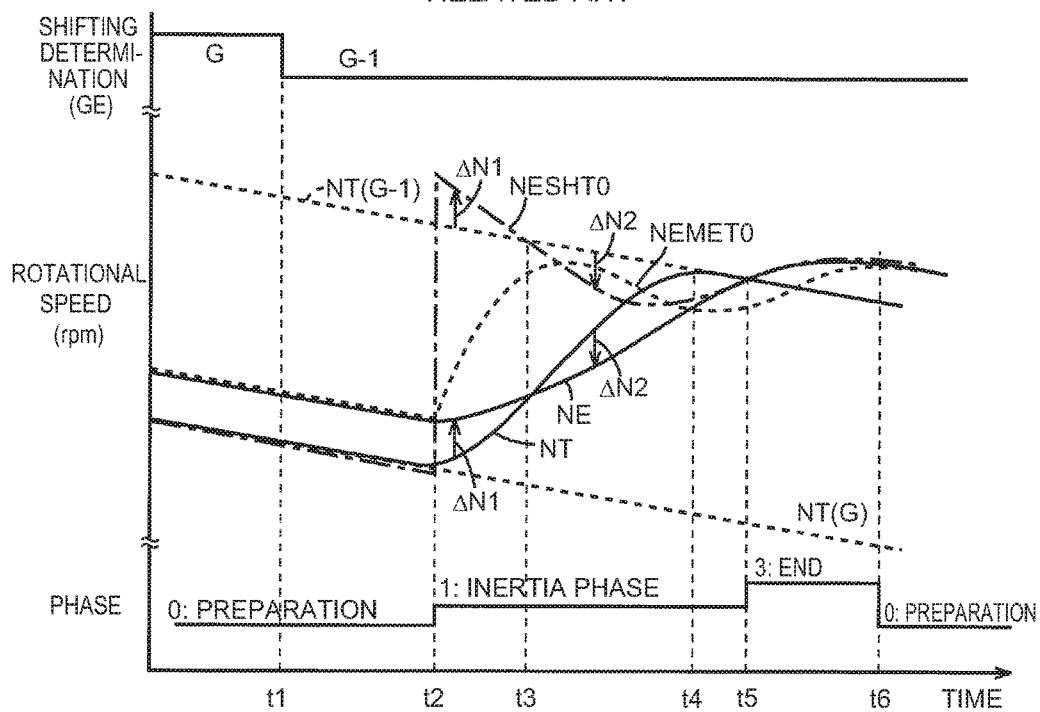
FIG. 3 is an operation waveform chart for illustrating one example of a phenomenon that occurs in a related art in meter display control in which the engine rotational speed displayed on the meter temporarily decreases.

FIG. 3 is an operation waveform chart for illustrating one example of the phenomenon that the engine rotational speed to be displayed temporarily decreases. With reference to FIGS. 2 and 3, the gear stage GE indicative of the result of shifting determination shows a change from G (for example, 3rd rotational speed) to G−1 (for example, 2nd rotational speed) at time t1.

A rotational speed NT(G) represents a turbine rotational speed calculated based on the vehicle speed V and the transmission gear ratio of the automatic transmission in a gear stage G. The rotational speed NT(G−1) represents a turbine rotational speed calculated based on the vehicle speed V and the transmission gear ratio of the automatic transmission in a gear stage G−1. In FIG. 3, since the vehicle speed is decreasing, both NT(G) and NT(G−1) decrease with the passage of time. With progress of shifting, the turbine rotational speed NT changes from NT(G) toward NT(G−1).

The phase indicative of the progress of shifting of the automatic transmission 14 corresponds to the phase signal F in FIG. 2. The phase changes in order of the preparation phase, the inertia-phase phase, and the end phase. In FIG. 3, the phase is the preparation phase (F=0) till time t2. At time t2 to t5, the phase is the inertia-phase phase (F=1). At time t5 to t6, the phase is the end phase (F=2). Then, at time t6, the phase is again the preparation phase.

When the engine rotational speed shows a sudden change as in shifting of the automatic transmission 14, the tachometer 18 tends to have a display delay. This response delay is attributed to the time taken for calculation processing of the engine rotational speed based on the input signal from the engine rotation sensor and to the time taken for the tachometer 18 to respond to the calculated engine rotational speed.

In order to eliminate the delay, it is considered to predict change in the engine rotational speed and to display the change on the tachometer 18. When a post-shift gear stage G−1 is available during shifting of the gear stage from G to G−1, it is possible to predict that the turbine rotational speed NT changes from NT(G) to NT(G−1). In the case where the torque converter 12 is in a lock-up state, NT(G−1) is set as a post-shift target value, and the value is filtered with the filter coefficient K indicative of an appropriate change speed. As a result, it becomes possible to change the meter display rotational speed NEMET prior to the detected change in the detected engine rotational speed NE.

However, in the case where the torque converter 12 is not in the lock-up state, a difference (NE−NT) in speed due to slipping of the torque converter 12 is generated between the engine rotational speed NE and the turbine rotational speed NT. Therefore, when the torque converter 12 is not in the lock-up state, the correction amount ΔN is added to the turbine rotational speed NT(G−1) obtained from the post-shift gear stage G−1 to obtain a target value that is the meter target rotational speed NESHT0. As the correction amount ΔN, NE-NT that is a difference between an input rotational speed and an output rotational speed of the torque converter 12 is used, for example.

In this case, the meter target rotational speed NESHT0 at time t2 to t5 is represented by a following expression: NESHT0=NT(G−1)+ΔN, where ΔN is a correction amount, and ΔN=(NE−NT).

Here, the difference between the input rotational speed and the output rotational speed of the torque converter 12 is not always a positive value. The sign of the difference NE−NT when the engine is driving is the reversal of the sign when the engine is driven.

When the engine is driving, the torque converter 12 is rotated with the motive power of the engine 10. In this state, the turbine rotational speed NT is smaller than the rotational speed NE of the engine 10 due to slipping of the torque converter 12 (NE>NT). When the engine is driven, the engine 10 is driven by the torque converter 12 side with the inertia force of the vehicle. In this state, the turbine rotational speed NT is larger than the engine rotational speed NE (NT>NE).

For example, when the vehicle is accelerated by the engine 10 in the state where the accelerator is turned on, the engine is in a driving state, so that NE>NT and therefore ΔN>0. When an engine brake is operated in the state where the accelerator is turned off, the engine is in a driven state, so that NE<NT, and therefore ΔN<0.

In the case where a downshift occurs in the state where the accelerator is turned off as illustrated in FIG. 3 in particular, NE>NT holds in an early stage of shifting (time t2 to t3). However, in a period where shifting progresses (time t3 to t5), the automatic transmission 14 side increases NT, which causes the torque converter 12 side to increase NE. As a result, NE<NT is established.

That is, at time t2 to t3 that is the beginning stage of shifting where the engine is in the driving state, the correction amount ΔN=ΔN1>0. As shifting progresses, the engine is in the driven state, and at time t3 to t5, the correction amount ΔN=ΔN2<0, so that the sign of the correction amount ΔN is reversed from positive to negative. Accordingly, the meter target rotational speed NESHT0 temporarily has a large fall, and so the meter display rotational speed NEMET0 that changes following after the meter target rotational speed NESHT0 as a target value behaves in a manner opposite from the engine rotational speed NE at time t3 to t4. Such behavior does not agree with the sense of the driver.

Accordingly, in the present embodiment, when the engine is in the driven state due to occurrence of downshifting in the state where the torque converter 12 is not in the lock-up state, the correction amount ΔN at the time when shifting is started, i.e., at the start of the inertia phase, is stored, and the correction amount ΔN is fixed to the stored value until the shifting is ended in order to prevent reversal of the signs of the correction amount ΔN.

Figure 4:
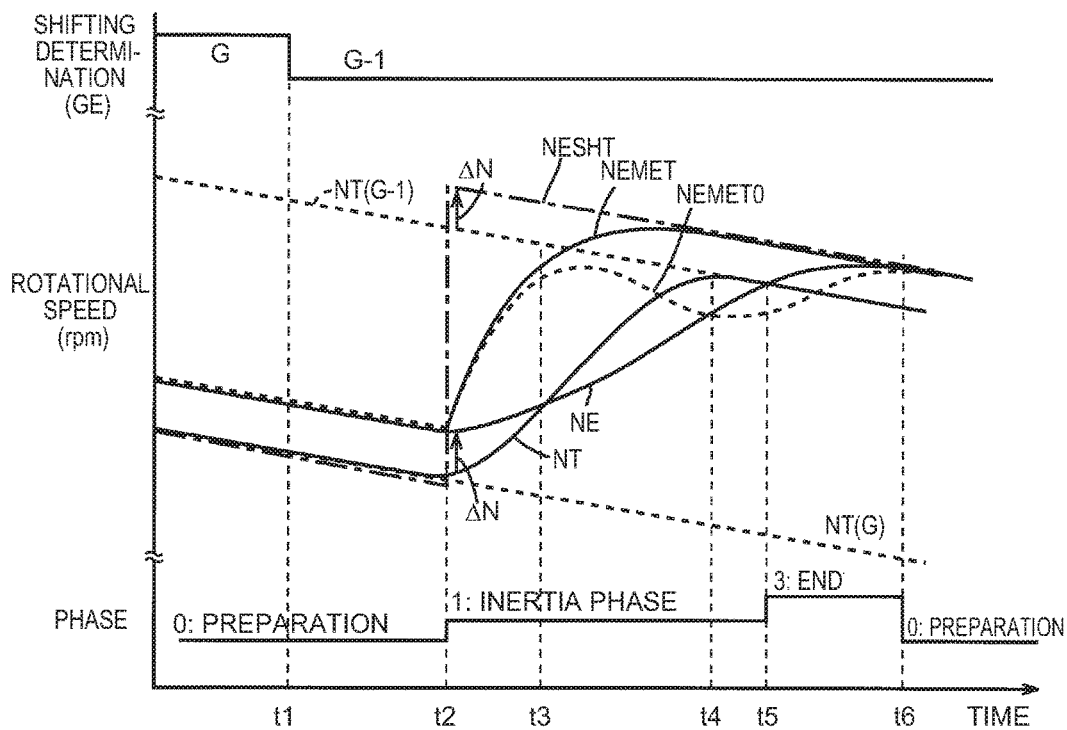
FIG. 4 is an operation waveform chart for illustrating improved meter display in the meter display control device of the present embodiment.

FIG. 4 is an operation waveform chart for illustrating the meter display improved in the present embodiment. Since the shifting determination and the phase in the waveform of FIG. 4 are similar to those illustrated in FIG. 3, redundant description is not provided. With reference to FIGS. 2 and 4, the correction amount ΔN(=NE−NT) is fixed at the start of shifting at t2 (at the time when the turbine rotational speed NT starts to move away from NT(G) toward NT(G−1)).

At time t2 to t6, the target value of the engine rotational speed NEMET (meter target rotational speed NESHT) to be displayed is NESHT=NT(G−1)+ΔN.

As a result of setting the meter target rotational speed NESHT as a target value, filtering the meter target rotational speed NESHT, and making the meter display rotational speed NEMET follow after the filtered meter target rotational speed NESHT, the meter display rotational speed NEMET gradually increases from time t2 to t4, and decreases with an inclination similar to that of NT(G−1) after time t4.

Unlike the meter target rotational speed NESHT0 illustrated in FIG. 3, the meter target rotational speed NESHT is controlled to such an extent that NT(G−1) decreases with deceleration of the vehicle because the correction amount ΔN does not vary.

Therefore, unlike the meter target rotational speed NESHT0 illustrated in FIG. 3, the meter display rotational speed NEMET changes in the same direction as the engine rotational speed NE, and therefore agrees with the sense of the driver.

Figure 5:
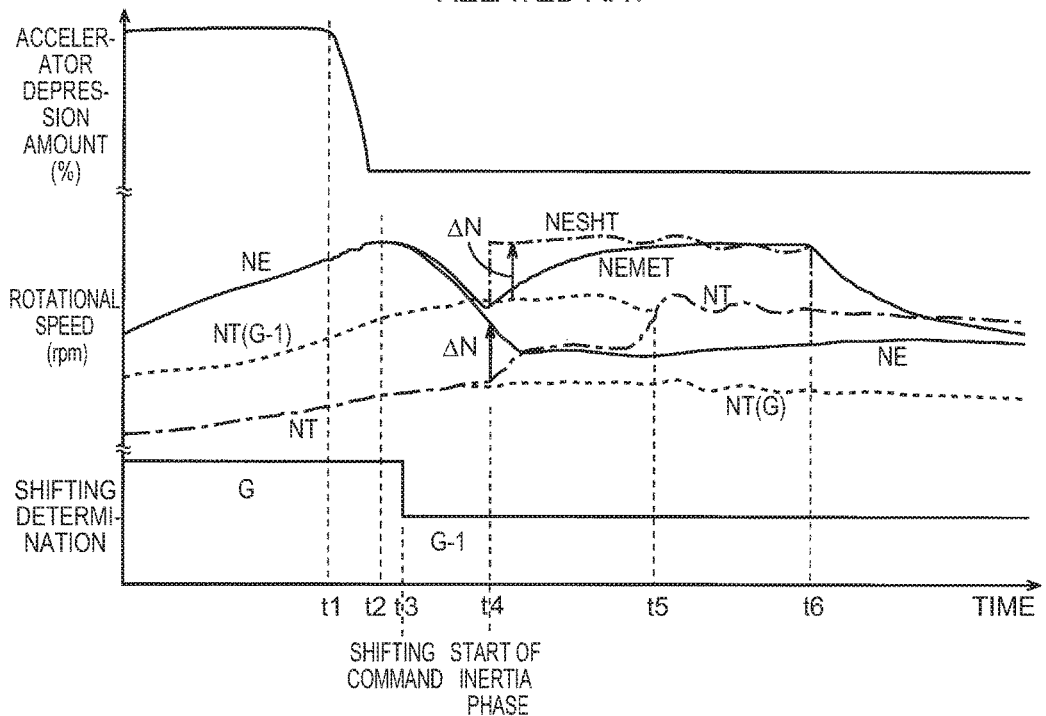
FIG. 5 is an operation waveform chart for illustrating one example of a phenomenon in the meter display control, in which the engine rotational speed displayed on the meter at the end of shifting rapidly decreases if the meter display is kept unimproved.

FIG. 5 is an operation waveform chart for illustrating a problem newly arises in the control illustrated in FIG. 4. At time t1, when the accelerator is suddenly turned off from a high depression state, the throttle opening Th is decreased to zero over a certain period of time and the engine torque is also controlled to decrease over a certain period of time in order to prevent behavior disturbance of the vehicle caused by rapid torque change. Accordingly, the engine rotational speed NE increases due to remaining torque between time t1 to t2. Although the engine rotational speed NE decreases after time t2, the engine rotational speed NE is still large at time t3. In this state, downshifting is instructed, and the gear stage changes from G to G−1.

At time t4, the turbine rotational speed NT starts to change toward the rotational speed NT(G−1) corresponding to the post-shift gear stage G−1, and the inertia-phase phase starts. In this case, the meter target rotational speed NESHT is set to a value obtained by adding the correction amount ΔN to the turbine rotational speed NT(G−1) corresponding to the post-shift gear stage (G−1). In this case, the correction amount ΔN is fixed to (NE−NT) at the start of shifting, i.e., at the start of the inertia phase. Since the engine rotational speed NE is large due to the remaining torque, the correction amount ΔN becomes a large value. As a result, the meter target rotational speed NESHT is set to a value considerably larger than the actual engine rotational speed NE.

After time t4, the meter display rotational speed NEMET gradually increases toward the meter target rotational speed NESHT. Since the meter target rotational speed NESHT is set to a high value, the meter display rotational speed NEMET significantly deviates from the engine rotational speed NE at the time of completion of shifting. As a result, a normal control termination routine fails to end the control, and so the control is forcibly ended at time t6. As a consequence, the meter target rotational speed NESHT is set to a current engine rotational speed NE, and the meter display rotational speed NEMET decreases toward the newly set meter target rotational speed NESHT. In this case, the actual engine rotational speed NE starts to decrease at time t2 as illustrated in FIG. 5, and gradually increases after time t4. This behavior of the meter display rotational speed NEMET is different from the engine rotational speed NE, which gives the driver a sense of incongruity.

Figure 6:
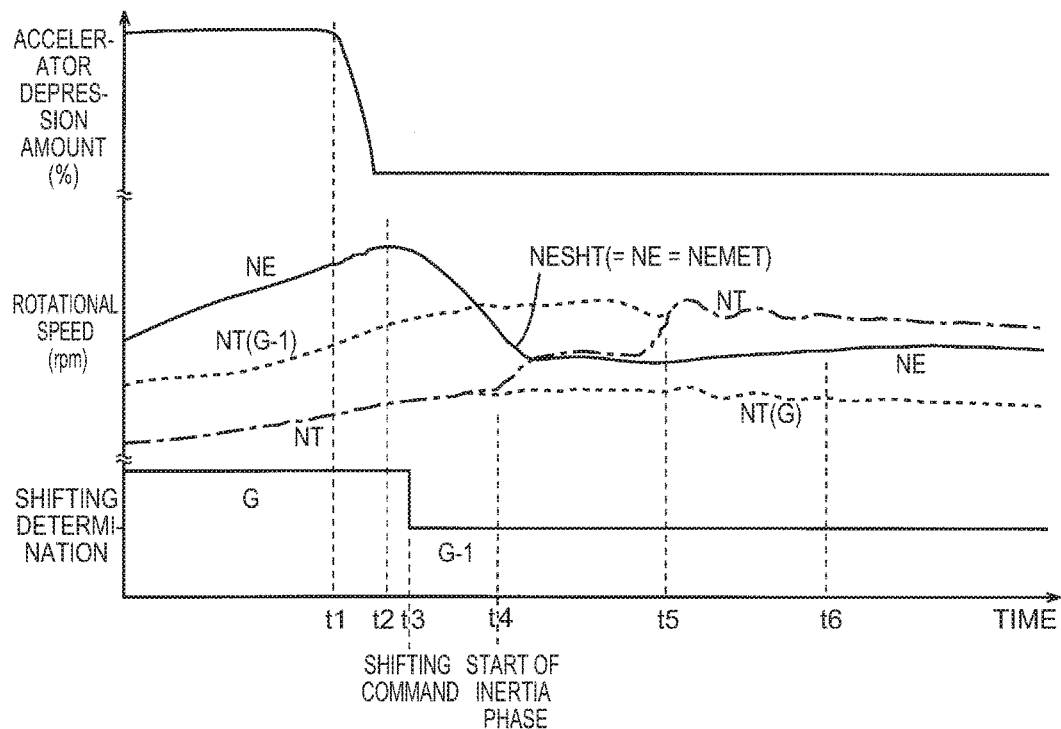
FIG. 6 is an operation waveform chart for illustrating meter display improved in the present embodiment by solving the problem illustrated in FIG. 5.

Accordingly, in the present embodiment, when downshifting is performed in the state where a difference between the engine rotational speed NE and the turbine rotational speed NT is large due to a large engine torque, the meter target rotational speed NESHT is set to the current engine rotational speed NE even in the inertia-phase phase as illustrated in FIG. 6 so as to prevent such decrease in the meter display rotational speed NEMET at the time of completion of shifting. As a consequence, the meter display rotational speed NEMET is generally maintained equal to the value of the actual engine rotational speed NE, so that considerable increase in the meter display rotational speed NEMET in the inertia phase is suppressed. This in turn suppresses rapid decrease of the meter display rotational speed NEMET at the time of completion of shifting, which prevents the vehicle from giving the driver a sense of incongruity.

A description is now given of the processing executed by the ECU 16 to implement the meter display of the embodiment illustrated in FIGS. 4 and 6.

Figure 7:
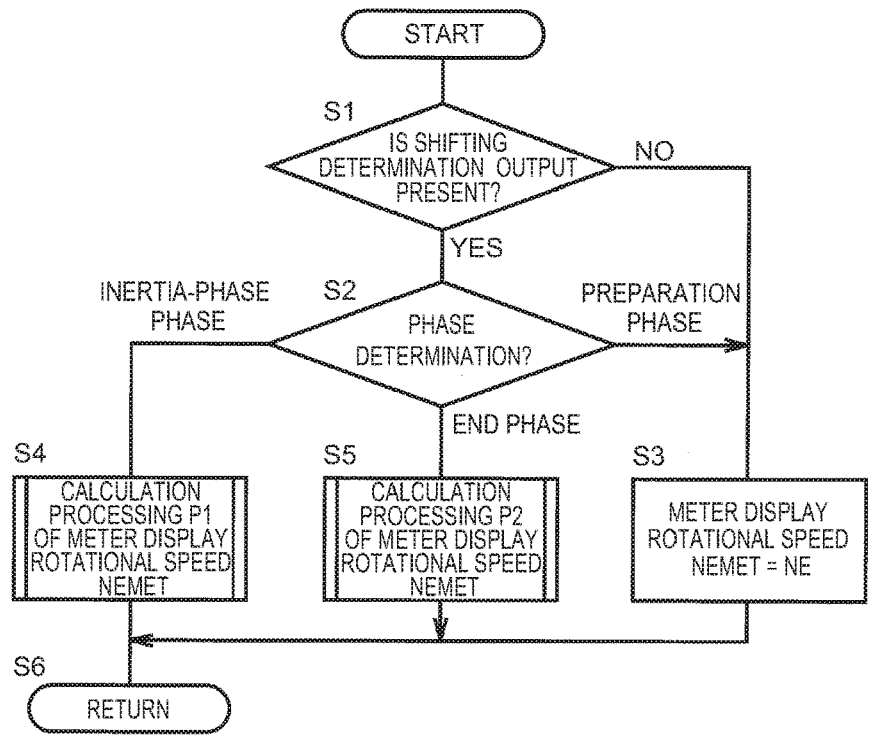
FIG. 7 is a flowchart illustrating one example of a main routine of meter display processing performed by the meter display control device of the present embodiment.

FIG. 7 is a main routine of meter display processing executed by the ECU 16. With reference to FIG. 7, the ECU 16 performs shifting determination in step S1 based on a gear shift diagram to determine whether or not a shifting determination output is present.

Figure 8:
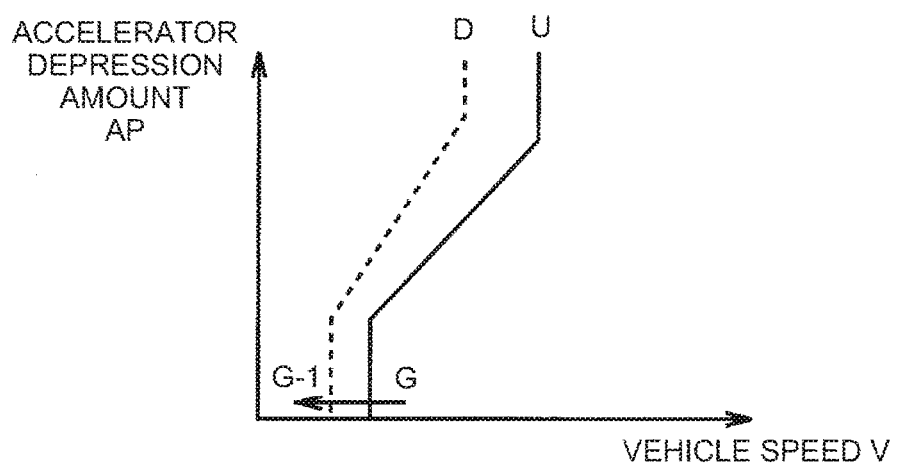
FIG. 8 illustrates one example of a gear shift diagram for illustrating a shifting determination output in the meter display control device.

FIG. 8 illustrates one example of the gear shift diagram for illustrating a shifting determination output. Assume the case of a downshift at the time of deceleration in the state where the accelerator is turned off. In this case, as shown in FIG. 8, if the vehicle speed V is decreased with the accelerator depression amount AP being zero, an operating point of the vehicle crosses a downshift line D from a high vehicle speed side to a low vehicle speed side, so that determination of downshifting from the gear stage G to the gear stage G-1 occurs.

Some of the vehicles incorporating the automatic transmission have a manual shift mode in which a downshift and an upshift are executed in response to shift lever commands from a user. When the manual shift mode is asserted in such vehicles, determination of upshifting and downshifting occurs in accordance with the shift lever operation of the user.

With reference to FIG. 7, when the ECU 16 determines that the shifting determination output is not present in step S1 (NO in step S1), the processing proceeds to step S3, where the meter display rotational speed NEMET is set to the current engine rotational speed NE, and the meter display rotational speed NEMET is transmitted to the tachometer 18.

When the ECU 16 determines that the shifting determination output is present in step S1 (YES in step S1), the processing proceeds to step S2. In step S2, phase determination indicative of the progress of shifting is executed. The processing of phase determination will be described later in detail with reference to FIG. 9.

When it is determined in step S2 that the current phase is the inertia-phase phase, the processing proceeds to step S4, where calculation processing P1 for calculating the meter display rotational speed NEMET is executed. The calculation processing P1 will be described later in detail with reference to FIGS. 10A and 10B.

When it is determined in step S2 that the current phase is an end phase, the processing proceeds to step S5, where calculation processing P2 for calculating the meter display rotational speed NEMET is executed. The calculation processing P2 will be described later in detail with reference to FIG. 13.

When it is determined in step S2 that the current phase is the preparation phase, the processing proceeds to step S3, where the ECU 16 sets the meter display rotational speed NEMET to the current engine rotational speed NE, and transmits the meter display rotational speed NEMET to the tachometer 18.

When the meter display rotational speed NEMET is calculated in any one of steps S3 to S5, the control is returned to the main routine in step S6.

Figure 9:
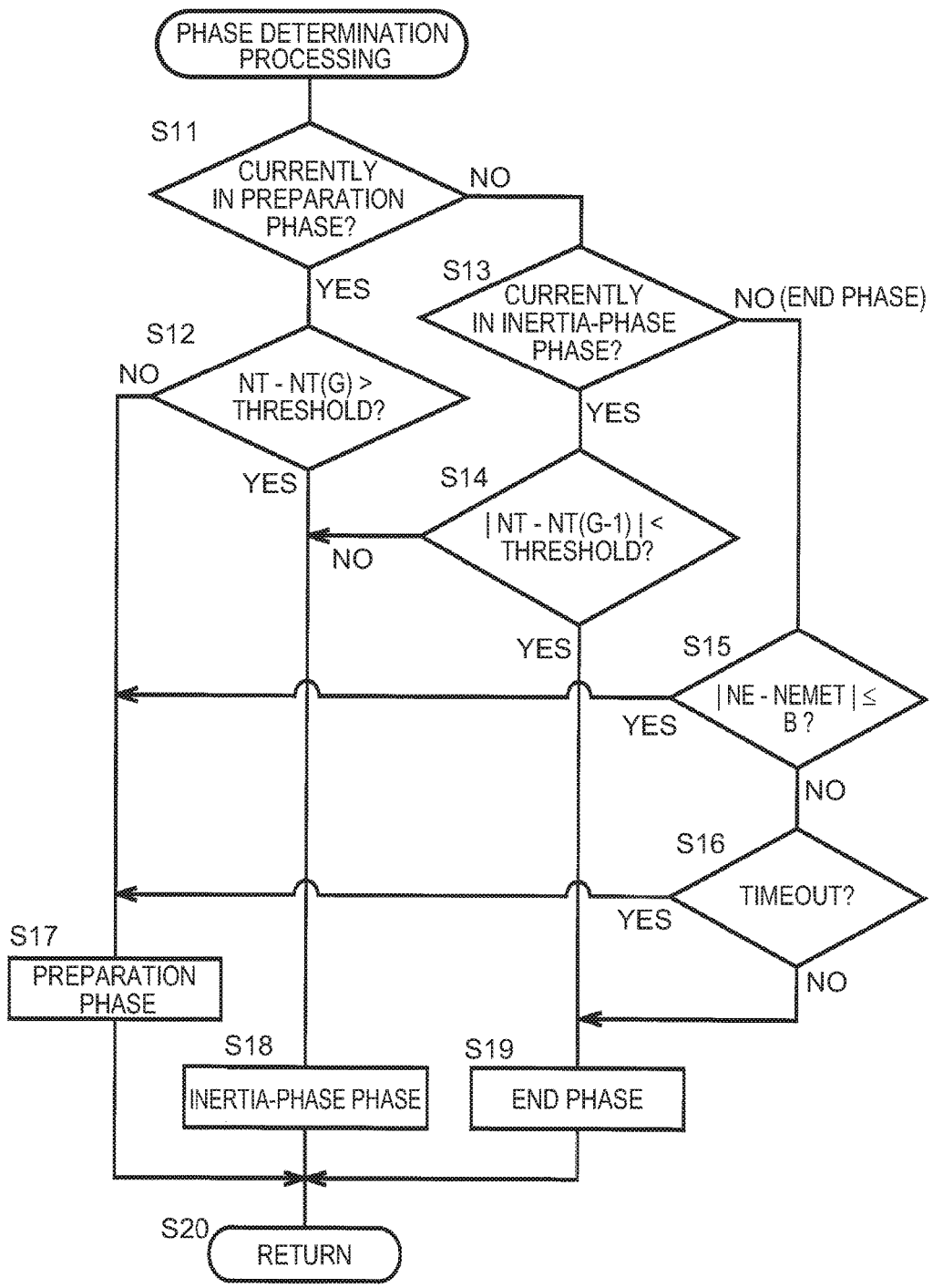
FIG. 9 is a flowchart for illustrating the phase determination processing executed in step S2 of FIG. 7.

FIG. 9 is a flowchart for illustrating the phase determination processing executed in step S2 of FIG. 7. With reference to FIG. 9, the ECU 16 first determines whether or not the current phase is the preparation phase in step S11. The ECU 16 stores the current phase as a variable F. In the case of F=0, the current phase is the preparation phase. In the case of F=1, the current phase is the inertia-phase phase. In the case of F=2, the current phase is the end phase.

When the current phase is the preparation phase in step S11 (YES in step S11), the processing proceeds to step S12. In step S12, the ECU 16 determines whether or not the current turbine rotational speed NT is away from the turbine rotational speed NT(G) corresponding to a pre-shift gear stage G. Specifically, the ECU 16 determines whether or not NT−NT(G) is larger than a threshold.

When NT−NT(G)>threshold is not satisfied in step S12 (NO in step S12), the processing proceeds to step S17, where the current phase is still determined to be the preparation phase. In step S12, when NT−NT(G)>threshold is satisfied (YES in step S12), the processing proceeds to step S18, where it is determined that the current phase shifts from the preparation phase to the inertia-phase phase. For example, around time t2 in FIG. 4, NT moves away from NT(G) and starts to increase toward NT(G−1). Since the determination result is YES in step S12, the phase shifts from the preparation phase to the inertia-phase phase.

In step S11, when it is determined that the current phase is not the preparation phase (NO in step S11), the processing proceeds to step S13. In step S13, it is determined whether or not the current phase is the inertia-phase phase.

In step S13, when it is determined that the current phase is the inertia-phase phase (YES in step S13), the processing proceeds to step S14. In step S14, it is determined whether or not a condition for the phase to shift from the inertia-phase phase to the end phase is satisfied. The condition is satisfied when the turbine rotational speed NT continues to be sufficiently close to the turbine rotational speed NT(G−1) corresponding to the post-shift gear stage G−1. Specifically, the condition is satisfied when a following expression is satisfied: |NT-NT(G−1)|<threshold.

When the condition for the phase to shift from the inertia-phase phase to the end phase is not satisfied in step S14 (NO in step S14), the processing proceeds to step S18, where the phase is kept as the inertia-phase phase. When the condition for the phase to shift from the inertia-phase phase to the end phase is satisfied in step S14 (YES in step S14), the processing proceeds to step S19, where it is determined that the phase shifts from the inertia-phase phase to the end phase.

For example, around time t5 in FIG. 4, the state where the turbine rotational speed NT becomes close to the target turbine rotational speed NT(G−1) is beyond a threshold. Since the determination result in step S14 is YES, the phase shifts from the inertia-phase phase to the end phase.

When the determination result is NO in step S13, the current phase is the end phase. In this case, it is determined in step S15 whether or not the difference between the meter display rotational speed NEMET and the engine rotational speed NE is equal to or less than a threshold B. When |NE−NEMET|≤B is satisfied in step S15 (YES in step S15), the phase shifts from the end phase to the preparation phase:

For example, around time t6 in FIG. 4, |NE−NEMET|≤B is satisfied. Since the determination result is YES in step S15, the phase shifts from the inertia-phase phase to the end phase.

When |NE−NEMET|≤B is not satisfied in step S15 (NO in step S15), the processing proceeds to step S16, where it is determined whether or not a timeout is applied. When the end phase continues for a predetermined period, the timeout is applied.

When the timeout is applied in step S16 (YES in step S16), the processing proceeds to step S17, where the phase shifts from the end phase to the preparation phase. When the timeout is not applied in step S16 (NO in step S16), the phase is maintained as the end phase.

When the phase is determined in any one of steps S17 to S19, the processing proceeds to step S20, where the control is returned to the flowchart of FIG. 7.

So far, the phase determination has been described, and now the calculation processing of the meter display rotational speed NEMET executed in the inertia-phase phase and the end phase is described in order.

Figure 10A:
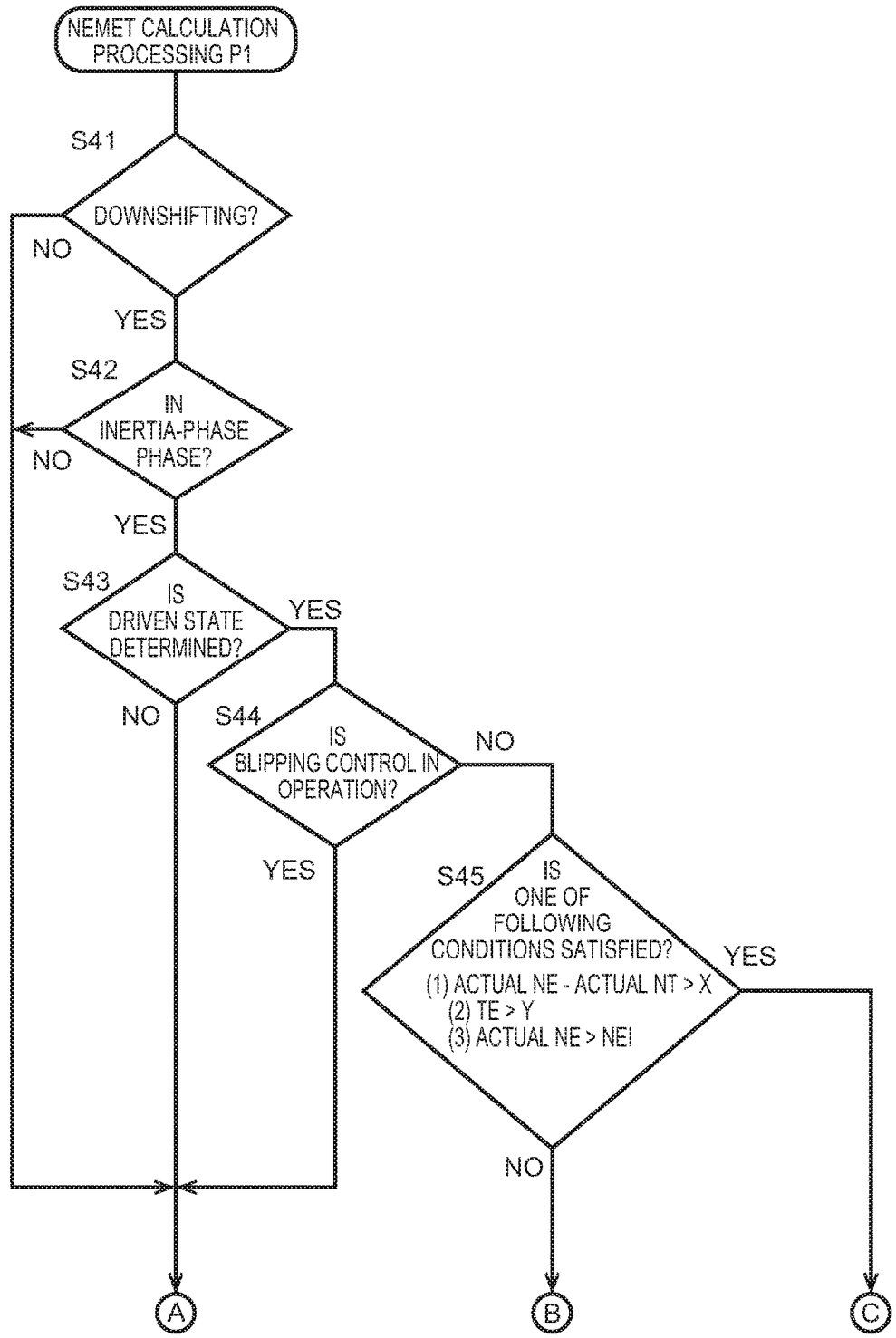
FIG. 10A is a flowchart for illustrating calculation processing P1 of the meter display rotational speed executed in an inertia-phase phase during shifting processing in the meter display control device.
Figure 10B:
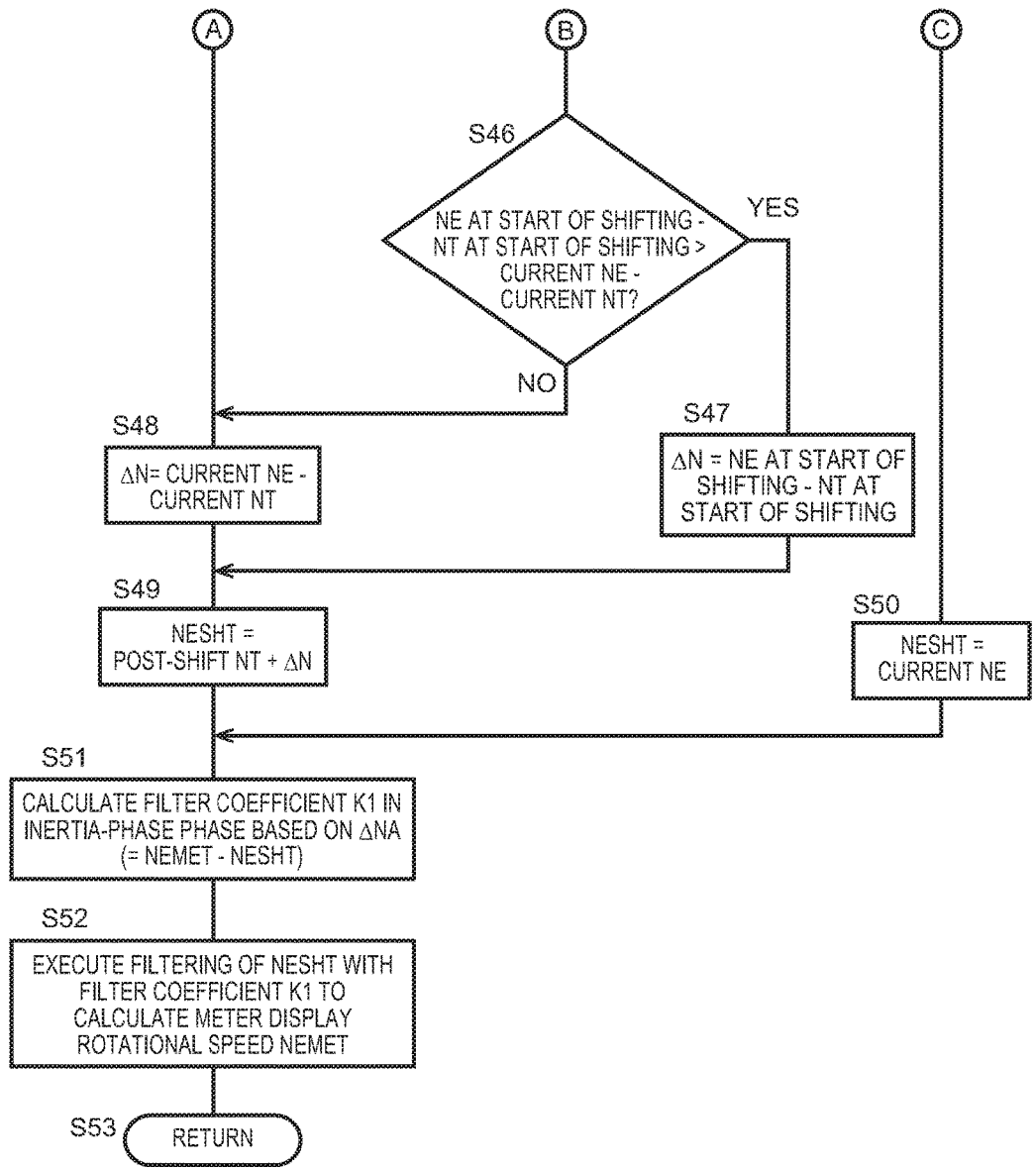
FIG. 10B is a flowchart for illustrating calculation processing P1 of the meter display rotational speed executed in an inertia-phase phase during shifting processing in the meter display control device.

FIGS. 10A and 10B are flowcharts for illustrating the calculation processing P1 of the meter display rotational speed NEMET executed in the inertia-phase phase during shifting processing. The processing of the flowchart is executed in the case where the phase is determined to be the inertia-phase phase in step S2 and then the processing proceeds to step S4 in the processing of the flowchart illustrated in FIG. 7.

With reference to FIGS. 10A and 10B, when the calculation processing P1 is started, the ECU 16 first determines whether or not a downshift is determined in step S41. As described in the foregoing, the downshift determination is output when the operating point of the vehicle crosses the downshift line D of FIG. 8 from the high vehicle speed side to the low vehicle speed side.

When a downshift is determined in step S41 (YES in S41), the processing proceeds to step S42. In step S42, the ECU 16 determines whether or not the automatic transmission is in the inertia-phase phase. For example, in FIGS. 4 and 6, if the turbine rotational speed NT moves away from the rotational speed corresponding to the pre-shift gear stage G and moves closer to the rotational speed corresponding to the post-shift gear stage G−1 as shifting progresses, then the period during which the turbine rotational speed NT changes is determined to be the inertia phase. Specifically, when NT−NT(G) is larger than a threshold in the phase determination routine illustrated in FIG. 9, the inertia phase is determined.

When it is determined that the automatic transmission is in the inertia-phase phase in step S42 (YES in S42), the processing proceeds to step S43. In step S43, the ECU 16 determines whether or not the engine is in the driven state.

Figure 11:
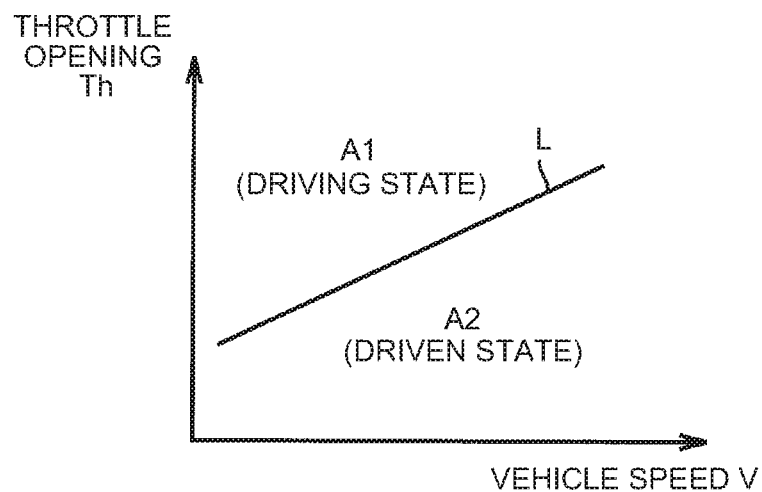
FIG. 11 illustrates one example of a map used for determining whether or not the engine is in a driven state in the meter display control device.

FIG. 11 illustrates one example of a map used for determining whether or not the engine is in the driven state. In FIG. 11, a vertical axis represents the throttle opening Th and a horizontal axis represents the vehicle speed V. A line L divides the plane of coordinates into a region A1 representative of the driving state and a region A2 representative of the driven state as illustrated in FIG. 11. When the throttle opening is larger than the line L, a large engine torque is generated, so that the vehicle is driven by the engine through the torque converter (the engine is in the driving state). When the throttle opening is smaller than the line L, the engine torque is too small so that the engine is driven with inertia force through the torque converter (the engine is in the driven state). The line L connects balancing points where driving force of the engine and travel resistance of the vehicle balance. As the vehicle speed is higher, the throttle opening becomes larger. The ECU 16 determines whether the current vehicle is in the state where the engine is driving or in the state where the engine is driven with reference to the map illustrated in FIG. 11 based on the vehicle speed V and throttle opening Th.

When it is determined that the engine is in the driven state in step S43 (YES in S43), the processing proceeds to step S44. In step S44, the ECU 16 determines whether or not blipping control is in operation. The blipping control is a process performed in downshifting for relaxing shifting shock by increasing the throttle opening and thereby increasing the engine torque.

When it is determined that the blipping control is not in operation in step S44 (NO in S44), the processing proceeds to step S45. In step S45, the ECU 16 determines whether or not an actual rotational speed display condition is satisfied. It is determined that the actual rotational speed display condition is satisfied when one of the following conditions are satisfied: (a) a difference between the actual engine rotational speed NE and actual turbine rotational speed NT is larger than a threshold X; (b) the engine torque TE is larger than a threshold Y; and (c) the actual engine rotational speed NE is larger than a post-shift estimated rotational speed NEi.

When it is determined that the actual rotational speed display condition is not satisfied in step S45 (NO in S45), the processing proceeds step S46. In step S46, the ECU 16 determines whether or not the difference between the engine rotational speed NE and the turbine rotational speed at the start of shifting is larger than the difference between the current engine rotational speed and the current turbine rotational speed.

When it is determined in step S46 that the difference between the engine rotational speed NE and the turbine rotational speed at the start of shifting is larger (YES in S46), the processing proceeds to step S47. In step S47, the correction amount ΔN is fixed to a value at the start of shifting. Then the processing proceeds to step S49. For example, at time t2 in FIG. 4, the turbine rotational speed NT moves away from the turbine rotational speed NT(G) corresponding to the pre-shift gear stage G, and starts to change toward the turbine rotational speed NT(G−1) corresponding to the post-shift gear stage G−1. Therefore, the difference (NE−NT) in rotational speed at time t2 is fixed as the correction amount ΔN, and is used for calculation of the meter target rotational speed NESHT subsequent to time t2.

When it is determined that the difference between the engine rotational speed NE and the turbine rotational speed at the start of shifting is smaller (S47 NO), it indicates that the difference between the input rotational speed (NE) and the output rotational speed (NT) of the torque converter starts to become larger than the difference at the time when the correction amount ΔN was fixed. Therefore, the fixed correction amount ΔN is canceled.

In the case where a downshift is not determined in step S41 (NO in S41), or the inertia phase is not determined in step S42 (NO in S42), the driven state is not determined in step S43 (NO in S43), or the blipping control is in operation in step S44 (YES in S44), or "NE at the start of shifting−NT at the start of shifting >current NE−current NT" is not satisfied in step S46 (NO in S46), then the processing proceeds to step S48, and the correction amount ΔN is not fixed but is computed by ΔN=NE−NT and updated. Then, the processing proceeds to step S49.

In step S49, the meter target rotational speed NESHT is calculated by a following expression: NEST=NT(G−1)+ΔN where NT(G−1) represents the rotational speed (=turbine rotational speed) of the input rotation shaft of the automatic transmission on assumption that the vehicle travels at the current vehicle speed V with the post-downshift gear stage G−1. Also in the above expression, ΔN represents the correction amount fixed in step S47, or the correction amount updated in step S48.

The aforementioned meter target rotational speed NESHT corresponds to the target engine rotational speed in filtering, the target engine rotational speed being used for calculating the meter display rotational speed NEMET. That is, the meter target rotational speed NESHT is a value before filtering and the meter display rotational speed NEMET is a value after filtering.

When it is determined that the actual rotational speed display condition is not satisfied in step S45 (YES in S45), the processing proceeds to step S50. In step S50, the current engine rotational speed NE is set as the meter target rotational speed NESHT.

The aforementioned actual rotational speed display condition is set to be satisfied when, for example, differences between the actual engine rotational speed NE and the actual turbine rotational speed NT before and after shifting are predicted to be considerably different due to the remaining torque in the case where a downshift is performed with the engine being in the driven state. If any one of the conditions is satisfied at the time of downshifting start determination, the actual engine rotational speed NE is in the state of being considerably high due to the remaining torque. If the meter target rotational speed NESHT is set to NESHT=NT(G−1)+ΔN with the correction amount being fixed to the correction amount ΔN obtained at the start of shifting, deviation between the actual engine rotational speed NE and NESHT increases at the time of completion of shifting since the actual engine rotational speed decreases after shifting is completed. As a consequence, NESHT rapid decreases at the end of the control, which gives the driver a sense of incongruity. When the current engine rotational speed NE is set as the meter target rotational speed NESHT as described in the foregoing, such deviation or rapid decrease in NESHT is eliminated.

For example, in the case such as immediately after release of the accelerator from a high depression state of the accelerator, smoothing is applied for a certain period of time to gradually set the engine torque to zero even with the accelerator being turned off, the smoothing being performed in order to prevent behavior disturbance of the vehicle caused by rapid torque change. If downshifting is performed in such a state by manual shifting operation, the actual engine rotational speed NE can be considerably high due to the remaining torque as described before.

The reference difference value X and the reference torque value Y are constants for determining the remaining state of the engine torque. While the values are set in accordance with the characteristics of the automatic transmission, the torque converter, and the like, values that cause no decrease in the meter display rotational speed so as to avoid the driver having a sense of incongruity may experimentally be set as the values X and Y.

For example, the engine torque TE in the actual rotational speed display condition is calculated by the ECU 16 based on the throttle opening Th. For example, the post-shift estimated rotational speed NEi is a theoretical engine rotational speed calculated based on a following expression indicative of a turbine torque TT using the turbine rotational speed NT and the engine torque TE as a parameter: $TT=Tr \times TE=C \times NEi^2$. In the expression, Tr is a torque ratio, and C is a capacity coefficient of the torque converter 12. Both Tr and C are obtained from a preset map and the like with a speed ratio E (=NEi/NT) as a parameter. From the above-stated relationship, the post-shift estimated rotational speed NEi is calculated by revolution computation.

After the meter target rotational speed NESHT is calculated in steps S49 and S50, a filter coefficient K1 of the inertia-phase phase is calculated based on the rotational speed difference ΔNA (=NEMET−NESHT) in step S51. The filter coefficient is described below.

Figure 12:
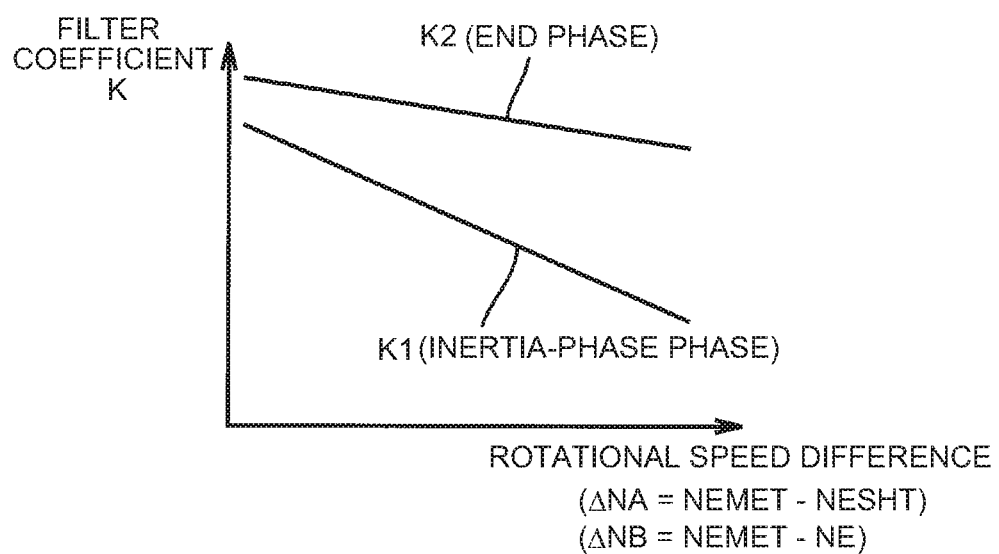
FIG. 12 illustrates one example of a map used for determining a filter coefficient in the display control of the meter display control device of the present embodiment.

FIG. 12 illustrates one example of a map used for determining the filter coefficient. In FIG. 12, a vertical axis represents the filter coefficient K and a horizontal axis represents the rotational speed difference. In the inertia-phase phase, the filter coefficient K1 is determined as illustrated in FIG. 12.

The ECU 16 determines a variation per processing cycle such that the current meter display rotational speed NEMET reaches a target value (a value before filtering) after the lapse of time corresponding to the filter coefficient K, and calculates the meter display rotational speed NEMET of a next cycle. Therefore, as the filter coefficient K is larger, the speed of following after the target value becomes slower, so that the change is gradually reflected on the output.

In FIG. 12, the filter coefficient K1 is smaller as the rotational speed difference between the current meter display rotational speed NEMET and the meter target rotational speed NESHT, which is a target value, is larger. That is, as the difference between the current value and the target value is larger, change in filtering output becomes faster. As the difference between the current value and the target value is smaller, the change filtering output becomes more gradual. Therefore, when the target value demonstrates a large change, follow-up performance is enhanced, whereas when the target value does not change so much, change such as a minute fluctuation is suppressed. The filter coefficient K2 will be described later with reference to a flowchart in FIG. 13.

With reference again to FIGS. 10A and 10B, once the filter coefficient K1 is determined in step S51, the processing proceeds to step S52. In step S52, the ECU 16 sets the meter target rotational speed NESHT as a target value to change the current meter display rotational speed NEMET, and executes filtering of the meter target rotational speed NESHT with the filter coefficient K1 to calculate a next meter display rotational speed NEMET. Based on the calculated meter display rotational speed NEMET, the rotational speed is displayed on the tachometer 18. Once the meter display rotational speed NEMET is calculated in step S52, the control is returned to the flowchart of FIG. 7 in step S53, so that the meter display rotational speed NEMET is output to the tachometer 18.

Figure 13:
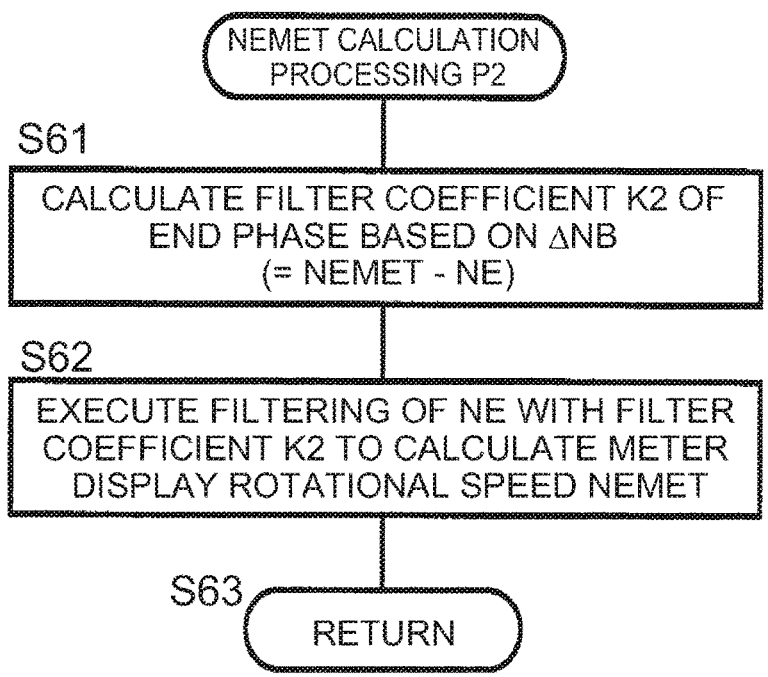
FIG. 13 is a flowchart for illustrating calculation processing P2 of the meter display rotational speed executed in an end phase of the shifting processing in the display control of the meter display control device of the present embodiment.

A description is now given of calculation processing of the meter display rotational speed NEMET executed in the end phase. FIG. 13 is a flowchart for illustrating the calculation processing P2 of the meter display rotational speed NEMET executed in the end phase during shifting processing. The processing of the flowchart is executed in the case where the phase is determined to be the inertia-phase phase in step S2 and then the processing proceeds to step S5 in the processing of the flowchart illustrated in FIG. 7. The calculation processing P2 is a process of gradually shifting the meter display rotational speed NEMET currently on display to the actual engine rotational speed NE by using filtering.

With reference to FIG. 13, when the calculation processing P2 is started, the ECU 16 first calculates a filter coefficient K2 of the end phase based a rotational speed difference $\Delta NB$ (=NEMET−NE) in step S61. For example, as illustrated in FIG. 12, the filter coefficient K2 of the end phase can be set to a value larger than the filter coefficient K1 of the inertia-phase phase. As the filter coefficient K is larger, the speed of change becomes slower. Since a variation width of the engine rotational speed in the end phase is smaller than that in the inertia-phase phase, K2>K1 is set. Like K1, the filter coefficient K2 is smaller as the speed difference is larger.

Once the filter coefficient K2 is determined in step S61, the processing proceeds to step S62. In step S62, the ECU 16 calculates the meter display rotational speed NEMET by executing filtering such that the meter display rotational speed NEMET approximates to the engine rotational speed NE, which is a target value of the meter display rotational speed, at a rotational speed corresponding to the filter coefficient K2. Based on the calculated meter display rotational speed NEMET, the rotational speed is displayed on the tachometer 18. Once the meter display rotational speed NEMET is calculated in step S62, the control is returned to the flowchart of FIG. 7 in step S63.

Figure 14A:
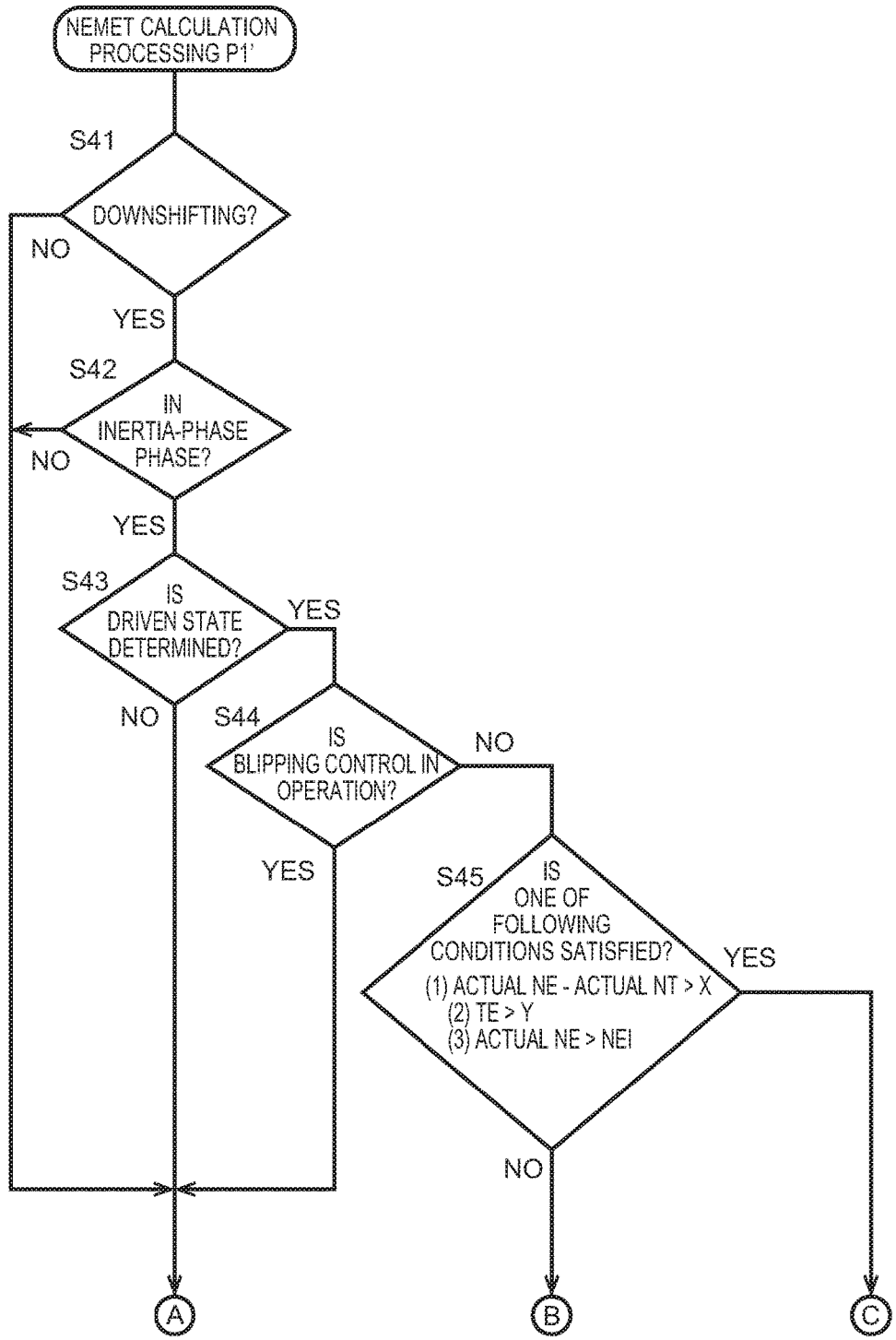
FIG. 14A illustrates a flowchart of calculation processing P1' executed in the inertia-phase phase as a modified example of the display control of the embodiment.

FIGS. 14A and 14B illustrates flowcharts for describing a calculation processing P1' as a modified example of the calculation processing P1 in the inertia-phase phase. The calculation processing P1' illustrated in FIGS. 14A and 14B corresponds to FIGS. 10A and 10B. The flow of the calculation processing P1' is partially different from that in FIGS. 10A and 10B. In the flow of the calculation processing P1', when an actual rotational speed display condition is satisfied in step S45 (YES in S45), the processing proceeds to step S53 so that the control is returned to the flowchart of FIG. 7. That is, the control including the calculation processing P1' is terminated and is returned to the main routine without calculation of the meter target rotational speed NESHT. Accordingly, the current engine rotational speed NE is set as the meter display rotational speed NEMET.

Finally, the present embodiment is summarized with reference to FIGS. 1 and 2 again. The ECU 16 is provided in a vehicle including the automatic transmission 14 equipped with the torque converter 12, and functions as a display control device for a meter configured to display the engine rotational speed. The ECU 16 is configured as described below. That is, when the shift start condition of the automatic transmission 14 is satisfied, the ECU 16 adds a correction amount $\Delta N$ corresponding to the state of the torque converter 12 to a turbine rotational speed NT(G−1) of the torque converter 12 corresponding to a post-shift gear stage so as to calculate a meter target rotational speed NESHT of the engine 10, and approximates a display rotational speed NEMET displayed on the meter to the meter target rotational speed NESHT. The ECU 16 fixes the correction amount $\Delta N$ to a value obtained at the time of shift start determination, when immobilization conditions are satisfied, the immobilization conditions including that the shift start condition for the automatic transmission to perform a downshift is satisfied and that the engine 10 is driven from the side of the torque converter 12. When the actual rotational speed display conditions are satisfied, it can be predicted that differences between an actual engine rotational speed NE and an actual turbine rotational speed NT before and after shifting are largely different due to the remaining torque. In this case, the ECU 16 sets the meter target rotational speed NESHT to the current engine rotational speed NE, or ends the control of calculating the meter target rotational speed NESHT and sets the meter display rotational speed NEMET to the engine rotational speed NE.

Preferably, the difference between the engine rotational speed NE and the turbine rotational speed NT can be used as the correction amount $\Delta N$. The correction amount can easily be obtained from the difference of rotational speed (NE-NT). As a method for calculating the correction amount, a calculation method involving a torque capacity of a clutch may be used, for example.

According to the above configuration, changes such as reversal of the signs of the correction amount $\Delta N$ do not occur in the driven state in which the engine 10 is driven by the torque converter 12. As a result, it becomes possible to reduce unnatural change in the display rotational speed NEMET of the meter.

Furthermore, in the case such as when a downshift is performed with a large engine torque, deviation between then actual engine rotational speed NE and the meter target rotational speed NESHT does not increase either. As a result, it becomes possible to reduce unnatural change in the display rotational speed NEMET of the meter while maintaining the responsiveness of the engine rotational speed displayed on the meter.

It should be understood that the embodiment disclosed is in all respects illustrative and is not considered as the basis for restrictive interpretation. The scope of the present disclosure is defined not by the foregoing description but by the range of appended claims. All changes which come within the range of the claims and the meaning and range of equivalency thereof are therefore intended to be embraced therein.

What is claimed is:

1. A display control device for a meter, the meter being provided in a vehicle including a torque converter and an automatic transmission and being configured to display rotational speed of an engine, the display control device comprising:
   an electronic control unit configured to:
   (i) when a shift start condition of the automatic transmission is satisfied, add a correction amount corresponding to a state of the torque converter to a turbine rotational speed of the torque converter corresponding to a post-shift gear stage so as to
      (a) calculate an estimated rotational speed of the engine,
      (b) set the estimated rotational speed as a meter target rotational speed, and (c) approximate a display rotational speed displayed on the meter to the meter target rotational speed;

(ii) fix the correction amount to a value obtained at a time of shift start determination, when immobilization conditions are satisfied, the immobilization conditions including that the shift start condition for the automatic transmission to perform a downshift is satisfied, and that the engine is driven from a side of the torque converter; and (iii) set as the meter target rotational speed a current engine rotational speed in place of the estimated rotational speed, when actual rotational speed display conditions are satisfied, the actual rotational speed display conditions including (a) that the shift start condition for the automatic transmission to perform the downshift is satisfied, (b) that the engine is driven from the side of the torque converter, and (c) that change in a difference between an engine rotational speed and the turbine rotational speed of the torque converter before and after shifting is determined to be large.

2. The display control device for a meter according to claim 1, wherein
the electronic control unit is configured to determine that change in a difference between the engine rotational speed and the turbine rotational speed of the torque converter before and after shifting is large, when any one of conditions are satisfied, the conditions including that (a) the difference between the engine rotational speed and the turbine rotational speed at a time when the shift start condition is satisfied is larger than a specified reference difference value, (b) engine torque is larger than a specified reference torque value, or (c) an actual engine rotational speed is larger than an estimated post-shift engine rotational speed.

3. The display control device for a meter according to claim 1, wherein
the correction amount is the difference between the engine rotational speed and the turbine rotational speed.

4. The display control device for a meter according to claim 1, wherein
the electronic control unit is configured to:
(i) cancel a fixed correction amount, and
(ii) use a difference between the current engine rotational speed and a current turbine rotational speed as the correction amount, when the difference between the current engine rotational speed and the current turbine rotational speed becomes larger than the fixed correction amount.

5. The display control device for a meter according to claim 1, wherein
the actual rotational speed display conditions further include that a phase during shifting of the automatic transmission is an inertia phase.

6. The display control device for a meter according to claim 1, wherein
the actual rotational speed display conditions further include that blipping control is not executed, the blipping control being control for increasing engine torque by increasing a throttle opening during shifting.

7. The display control device for a meter according to claim 1, wherein
the electronic control unit is configured to:
(i) determine whether or not the shift start condition is satisfied based on an accelerator depression amount and a vehicle speed, and output the post-shift gear stage,
(ii) calculate a post-shift turbine rotational speed based on the vehicle speed and the post-shift gear stage, and add the correction amount to the post-shift turbine rotational speed to calculate the estimated rotational speed, and (iii) switch the meter target rotational speed to one of the estimated rotational speed and a rotational speed of the engine detected with a rotation sensor based on a progress state of shifting, and output the display rotational speed such that the display rotational speed follows after the target value.

8. A display control device for a meter, the meter being provided in a vehicle including a torque converter and an automatic transmission and configured to display rotational speed of an engine, the display control device comprising:
an electronic control unit configured to:
(i) when a shift start condition of the automatic transmission is satisfied, add a correction amount corresponding to a state of the torque converter to a turbine rotational speed of the torque converter corresponding to a post-shift gear stage so as to
(a) calculate an estimated rotational speed of the engine,
(b) set the estimated rotational speed as a meter target rotational speed, and
(c) approximate a display rotational speed displayed on the meter to the meter target rotational speed;
(ii) fix the correction amount to a value obtained at a time of shift start determination, when immobilization conditions are satisfied, the immobilization conditions including that the shift start condition for a downshift is satisfied, and that the engine is driven from a side of the torque converter; and
(iii) end a series of control including calculation of the estimated rotational speed, when actual rotational speed display conditions are satisfied, the actual rotational speed display conditions including (a) that the shift start condition for the automatic transmission to perform the downshift is satisfied, (b) that the engine is driven from the side of the torque converter, and (c) that change in a difference between an engine rotational speed and the turbine rotational speed of the torque converter before and after shifting is determined to be large.

9. The display control device for a meter according to claim 8, wherein
the electronic control unit is configured to determine that change in a difference between the engine rotational speed and the turbine rotational speed of the torque converter before and after shifting is large, when any one of conditions are satisfied, the conditions including that (a) the difference between the engine rotational speed and the turbine rotational speed at a time when the shift start condition is satisfied is larger than a specified reference difference value, (b) engine torque is larger than a specified reference torque value, or (c) an actual engine rotational speed is larger than an estimated post-shift engine rotational speed.

10. The display control device for a meter according to claim 8, wherein
the correction amount is the difference between the engine rotational speed and the turbine rotational speed.

11. The display control device for a meter according to claim 8, wherein
the electronic control unit is configured to:
(i) cancel a fixed correction amount, and
(ii) use a difference between a current engine rotational speed and a current turbine rotational speed as the correction amount, when the difference between the current engine rotational speed and the current turbine rotational speed becomes larger than the fixed correction amount.

12. The display control device for a meter according to claim 8, wherein
the actual rotational speed display conditions further include that a phase during shifting of the automatic transmission is an inertia phase.

13. The display control device for a meter according to claim 8, wherein
the actual rotational speed display conditions further include that blipping control is not executed, the blipping control being control for increasing engine torque by increasing a throttle opening during shifting.

14. The display control device for a meter according to claim 8, wherein
the electronic control unit is configured to:
(i) determine whether or not the shift start condition is satisfied based on an accelerator depression amount and a vehicle speed, and output the post-shift gear stage,
(ii) calculate a post-shift turbine rotational speed based on the vehicle speed and the post-shift gear stage, and add the correction amount to the post-shift turbine rotational speed to calculate the estimated rotational speed, and
(iii) switch the meter target rotational speed to one of the estimated rotational speed and a rotational speed of the engine detected with a rotation sensor based on a progress state of shifting, and output the display rotational speed such that the display rotational speed follows after the target value.

* * * * *